United States Patent [19]

Robinson

[11] Patent Number: 4,528,978
[45] Date of Patent: Jul. 16, 1985

[54] SOLAR ROCKET ABSORBER

[75] Inventor: Philip I. Robinson, Calabasas, Calif.

[73] Assignee: The United States of America as represented by the Secretary of the Air Force, Washington, D.C.

[21] Appl. No.: 559,169

[22] Filed: Dec. 8, 1983

[51] Int. Cl.$^3$ .............................................. F24J 3/02
[52] U.S. Cl. .................................. 126/438; 126/441; 126/442; 126/450; 60/203.1; 60/641.8; 60/641.15; 165/163
[58] Field of Search ............... 126/438, 440, 441, 442, 126/448, 450; 60/203.1, 641.8, 641.13, 641.14, 641.15, 730; 165/163

[56] References Cited

U.S. PATENT DOCUMENTS

| 1,951,403 | 3/1934 | Goddard | 126/271 |
|---|---|---|---|
| 3,064,418 | 11/1962 | Sanders | 60/26 |
| 3,153,279 | 10/1964 | Chessin | 29/420 |
| 3,203,167 | 8/1965 | Green | 60/26 |
| 3,903,700 | 9/1975 | Glickman | 60/641 |
| 3,927,659 | 12/1975 | Blake et al. | 126/271 |
| 3,968,652 | 7/1976 | Chevalier | 60/641 |
| 3,998,205 | 12/1976 | Scragg et al. | 126/271 |
| 4,029,077 | 6/1977 | Gorniak | 126/440 |
| 4,036,012 | 7/1977 | Monsler | 60/203 |
| 4,258,698 | 3/1981 | Sales | 126/440 |
| 4,354,348 | 10/1982 | Lee | 60/203.1 |

FOREIGN PATENT DOCUMENTS

| 2833098 | 2/1980 | Fed. Rep. of Germany | 126/442 |
|---|---|---|---|
| 1179202 | 5/1959 | France | 126/440 |

OTHER PUBLICATIONS

"Development of a Solar Receiver for an Organic Rankine Cycle Engine", Conference: Proceedings of the 16th Intersociety Energy Conversion Engineering Conference, Technologies for the Transition, Atlanta, GA. (Aug. 9, 1981), pp. 1764–1769.

Gov. Contract Report RTD-TDR-63-1085, "Research and Development Studies to Determine Feasibility of a Solar LH$_2$ Rocket Propulsion System", by Electro-Optical Systems, Inc., Pasadena, CA, pp. 157–219, Sep. 1963.

Primary Examiner—Margaret A. Focarino
Attorney, Agent, or Firm—Donald J. Singer; Stanton E. Collier

[57] ABSTRACT

A solar rocket absorber of rhenium tubes is used to provide heated liquid hydrogen to a thruster. The rhenium tubes are wrapped in a closed shape having an opening for receiving solar radiation for heating the liquid propellant. The vessel of rhenium tubes is held by a carbon shell which is further encased in a reradiation shield to prevent heat loss.

10 Claims, 2 Drawing Figures

SOLAR ROCKET ABSORBER

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to rocket motors, and, in particular, relates to an absorber for use in outer space that heats a liquid by solar energy and outputs the heated fluid to a thruster.

Satellites parked in a stationary orbit need thrusters to correct and maintain a position in orbit; otherwise, eventually, the satellite will drift out of the desired position and thus become useless. Once the satellite is correctly positioned, thrusters having a small specific impulse can be turned on and off to maintain the proper stationary orbit. Although this use of thrusters is clear, other uses are also needed where a low specific impulse is sufficient.

One thruster uses a liquid propellant and an oxidizer that are combined in the thrust chamber. Ignition occurs upon contact. This thruster requires storage of two liquids, piping for both and pumps.

Another thruster uses a liquid propellant that is heated to a high degree by an internal source. This type of thruster is heavier and requires constant standby energy to maintain the heat source in a ready state.

Another type of thruster uses an external source of heat, i.e., the sun, to heat the liquid propellant to a high degree for expansion. Previous designs of absorbers, the device to super heat the liquid propellant, were complicated, difficult to manufacture, and inefficient.

The above problems have motivated a search for a solar absorber for minimizing weight, manufacturing problems, and other inefficiencies.

SUMMARY OF THE INVENTION

The present invention sets forth an absorber and thereby overcomes the problems set forth hereinabove.

A four-coiled rhenium tube absorber is formed in the shape of a cylindrical pressure vessel with hemispherical tops. One of the tops is truncated to make a circular opening. The vessel wall is formed by four, circumferentially wound parallel tubes. At the opening, the tubes enter the vessel tangentially to the opening, and as the tubes approach the closed end, the tubes are wound around increasingly smaller circumferences until the minimum allowable bend radius is reached. The remaining hole is filled with a graphite plug which has the input tubes routed through the plug to provide the necessary cooling. The vessel is placed in a shell to provide structural support and a radiation shield is added to protect against heat loss.

A double-coiled rhenium tube absorber is shaped like an inverted top hat. Two parallel rhenium input tubes are wound to form the "brim" or disk of the absorber. The tubes enter at the outer edge of the brim tangentially and are connected to a hydrogen inlet manifold. The tubes are wound tightly enough to form a continuous brim to provide a solid barrier to the incident solar radiation. From the inner edge of the brim, the tubes are bent at 90 degrees to the brim and winding is continued to form a cylindrical vessel of the absorber. The tubes are wound in the shape of a loose helix allowing space to remain between each coil. Once the vessel is completed, the tubes are again bent at 90 degrees and a disk, the top of the hat, is wound to complete the hat shape. The disk is also tightly wound as the brim leaving no space between the coils. The tubes at the center of the disk reverse direction and wind back up the disk and cylindrical vessel and exit next to the top disk. The absorber is housed in a graphite shell to provide structural support. The inner surface of the shell has splines into which is machined a helical groove. The pitch of the groove and the rhenium cylindrical coils are the same so that the coils can be threaded into the graphite shell. The groove in the splines locates the coils one-half tube radius away from the shell which allows the backside of the coils to absorb reflected radiation. The coils also tends to reduce re-radiation losses from the cavity by physically blocking a portion of the re-radiation. The graphite shell in both designs will be coated with a CVD refractory carbide coating to stop the migration of carbon into the rhenium coils.

It is, therefore, one object of the present invention to provide for an absorber that utilizes a coiled tube design;

It is another object of the present invention to provide for an absorber that is simple in design and of low weight; and It is a further object of the present invention to provide for an absorber that can be fabricated easily.

These and many other objects, features, and advantages of the present invention will be readily apparent to one skilled in the pertinent art from the following detailed description of a preferred embodiment of the invention and related drawings when considered in conjunction with the claims.

DETAILED DESCRIPTION OF THE PREFERRED EMBODIMENT

Figure 1:
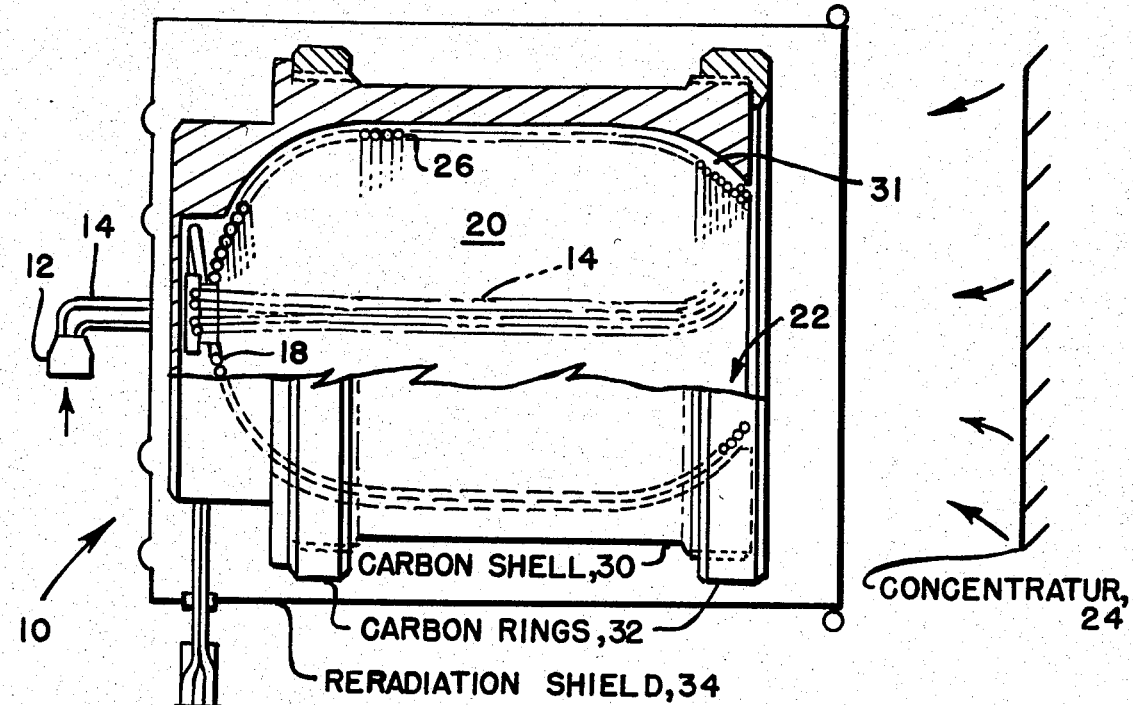
FIG. 1 is a cross-section of the absorber of this invention.

One of the keys to a high performance solar thermal rocket is an absorber 10, shown in FIG. 1, that is highly efficient so that there can be a reduction in the spacecraft collector size and weight as well as other components in the system.

A high absorber efficiency results in the maximum thrust for a fixed final propellant temperature and a given solar concentrator. To achieve high propellant temperatures effectively, the absorber reflected and re-radiation losses must be minimized. These losses are strongly influenced by the absorber configuration, materials selected, absorber cooling, and radiation shielding.

A study of available materials indicated that rhenium is the most promising material because of weldability, refractory abilities, and ductility. Rhenium tubes, for example, 0.117 inches OD and a wall thickness of 0.010 inches, are made by the chemical vapor deposition process. Currently, the tubes are available in four foot lengths. Because of the ease of welding rhenium, a tube of any desired length can be obtained by welding multiple four foot lengths together. Welded joints will be made with a ¼ to ½ inch sleeve fitted over the tube junction. The sleeve will be electron beam (EB) welded to each of the tubes. The thruster will also be EB welded to the tubes as needed.

Referring to FIG. 1, a cylindrical shaped absorber 10 is shown in cross-section. Upon command, the liquid hydrogen, for example, stored in a container, not shown, is allowed to flow into an input coupling 12 by a control valve, not shown.

The liquid hydrogen enters in a group of four parallel tubes 14 that enter a graphite plug 16 that fills a rear opening 18. The liquid hydrogen that passes therethrough cools plug 16 from solar radiation. From plug 16, tubes 14 are routed to a front opening 22 after traversing the outside of a wall 26 and are there bent to form opening 22 that allows solar radiation to enter a vessel 20 from a solar concentrator 24. Tubes 14 are bent in a cylindrical fashion to form wall 26 of vessel 20. Vessel 20 is bottle shaped with rear and front openings 18 and 22 having a diameter smaller than vessel 20. When the radius of curvature becomes too small for bending tubes 14, this defines the diameter of rear opening 18. Tubes 14 are then joined by welding to a thruster 28. A carbon shell 30, being in split halves, fixedly holds vessel 20 with a plurality of splines 31, only one is shown. Splines 31 run traversely with respect to vessel 20. Carbon rings 32 hold carbon shell 30 together. In order to maintain heat within shell 30, a re-radiation shield 34 is positioned about carbon shell 30 and allows the liquid hydrogen to flow into and out by means of tubes 14.

An input coupling 12 can be platinium brazed to tubes 14 since the temperature at that point should remain below 2500 R and thus amenable to platinum brazing. Thruster 28 can be formed by chemical vapor deposition and welded to tubes 14.

If carbon infiltration causes rhenium tubes 14 to weaken, a coating of CVD tungsten can be applied to shell 30. The tungsten and carbon would react to form tungsten carbide and thus prevent carbon infiltration into the rhenium.

Figure 2:
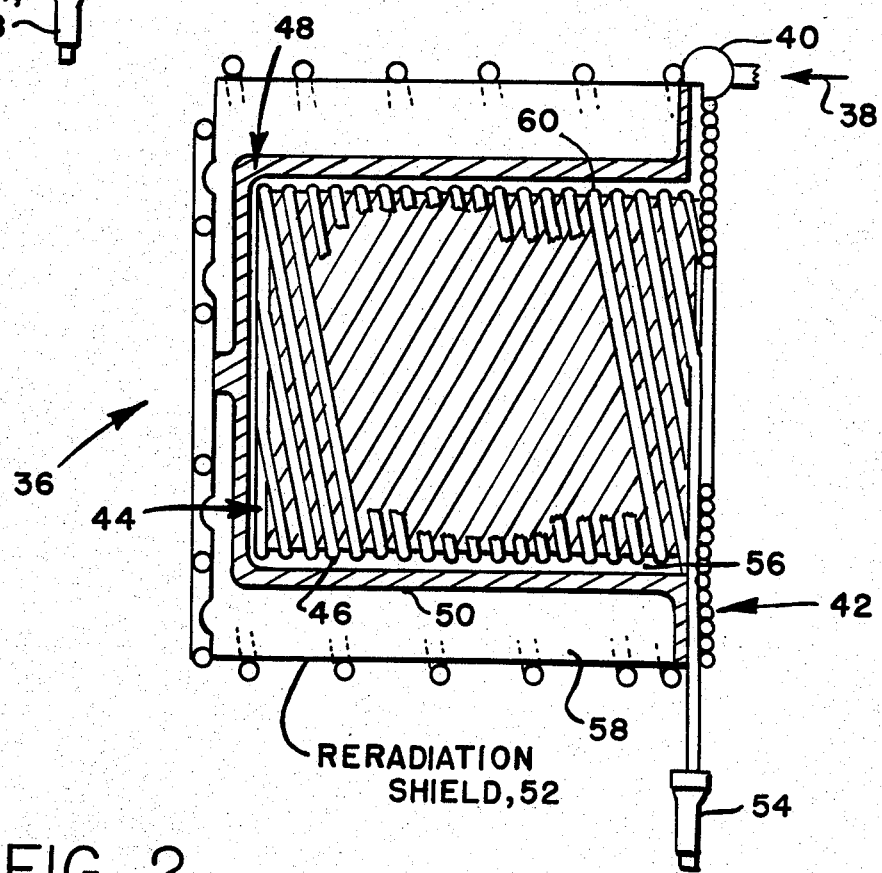
FIG. 2 is a cross-section of the alternative absorber of this invention.

Referring to FIG. 2, an alternate absorber 36 is shown. A pair of parallel tubes 38 enter at an input coupling 40 from which they spiral inward to form a brim 42 of absorber 36. Tubes 38 can be wound tightly enough to form continuous brim 42 to provide a solid barrier to the incident solar radiation. Tubes 38 exit brim 42 at a 90 degree angle and wind to form a cylindrical vessel 44. Tubes 38 are wound in the shape of a loose helix allowing space to remain between each coil 46. Once vessel 44 is completed, tubes 38 are again bent at 90 degrees and a disk 48 is wound at the top of the hat-shaped absorber 36. Disk 48 is tightly wound leaving no space between tubes 38. Tubes 38 reverse direction of winding in disk 48 and wind back on vessel 44 and exit near brim 42 to connect to a thruster 54.

Absorber 36 is housed in a graphite shell 50 to provide structural support. The inner surface of shell 50 has a plurality of splines 56 into which is machined a helical groove 60. The pitch of groove 60 and rhenium coils 46 are the same. Groove 60 in splines 56 locate coils 46 one-half tube radius from shell 50 which allows the backside of coils 46 to absorb reflected radiation. Coils 46 tend also to reduce re-radiation losses from vessel 44 by physically blocking a portion of the re-radiation. In order to maintain heat within shell 50, a re-radiation shield 58 is positioned about carbon shell 50 and is cylindrical shaped. As in the case of absorber 10 having four parallel tubes 14, shell 50 would be coated with a CVD refractory carbide coating.

Clearly, many modifications and variations of the present invention are possible in light of the above teachings and it is therefore understood, that within the inventive scope of the inventive concept, the invention may be practiced otherwise than specifically claimed.

Table I shows the advantages and disadvantages of the two designs.

TABLE I

| TYPICAL HEAT EXCHANGER CAVITY TEST HARDWARD DESIGN COMPARISON | | | |
|---|---|---|---|
| DESIGN | DESIGN FEATURES | ADVANTAGES | DISADVANTAGES |
| Coiled Rhenium Tubes FOUR-TUBE | *Rhenium Tube Cavity *Carbon Composite or Graphite Jacket | *Closed-Coiled Tube Winding Provides Sturdy Construction *Fabrication is within the State of the Art | *Requires Radiation Shield *Uses High Cost Material *High Weight |
| Coiled Rhenium Tube TWO-TUBE | *Open Coiled Rhenium Tube-Graphite Cylinder Cavity | *Simple Design *Fabrication Ease *Low Weight *Full utilization of Coil surface Area (Reduction of Re-radiation) *Free to Grow from Thermal Loading *Uses Less Tube Material | *Requires Radiation Shield *Uses High Cost Material *Possible Re-radiation Loss from External Surfaces |

What is claimed is:

1. A solar rocket absorber, said absorber receiving solar radiation to heat a liquid propellant passed therethrough and output through a thruster, said absorber comprising:
   a vessel, said vessel being shaped as a cylindrical tube with a pair of hemispherical tops, each of said tops having a concentric opening therein, said vessel being formed by parallel tubes having said liquid propellant therein, said tubes having an input coupling attached to an input end and a thruster attached to an output end, one of said concentric openings being a front opening for receiving solar radiation, and the other of said concentric openings being a rear opening;
   a plug positioned in said rear opening to block the transmission of solar radiation therefrom, said plug being cooled by liquid propellant in said tubes;

a shell for holding said vessel, said shell having a cavity therein closely conforming to the shape of said vessel, said shell having a first opening to allow solar radiation to enter said front opening of said vessel, said cavity having a plurality of splines thereon to hold off said vessel, said shell being separable for purposes of inserting said vessel therein, said shell having rings circumferentially attached about said shell to fixedly hold said shell together; and a reradiation shield positioned about said shell to prevent the transmission of heat from said shell.

2. A solar rocket absorber as defined in claim 1 wherein said tubes are parallel groups of four wrapped to form said vessel.

3. A solar rocket absorber as defined in claim 2 wherein said tubes are made of rhenium.

4. A solar rocket absorber as defined in claim 3 wherein said shell is made of carbon.

5. A solar rocket absorber as defined in claim 4 wherein said shell has a CVD refracting carbide coating to prevent the migration of carbon to said rhenium.

6. A solar rocket absorber, said absorber receiving solar radiation to heat a liquid propellant passed therethrough and output through a thruster, said absorber comprising:

a vessel, said vessel being shaped as a top hat, said vessel being formed by parallel tubes having said liquid propellant therein, said tubes being in close contact to form a brim of said vessel, said tubes exiting said brim at a 90 degree angle and thereafter being loosely coiled to form a cylinder, said tubes again being bent at a 90 degree angle and thereafter forming a disk, said tubes reversing direction in said disk and winding back on said vessel to exit rear said brim;

a shell having splines in a cavity for holding said vessel, said splines fixedly holding said vessel away from said shell; and a reradiation shield positioned about said shell.

7. A solar rocket absorber as defined in claim 6 wherein said tubes are a parallel group of two wrapped to form said vessel.

8. A solar rocket absorber as defined in claim 7 wherein said tubes are made of rhenium.

9. A solar rocket absorber as defined in claim 8 wherein said shell is made of carbon.

10. A solar rocket absorber as defined in claim 9 wherein said shell has a CVD refracting carbide coating to prevent the migration of carbon to said rhenium.

* * * * *